(12) United States Patent
Tsirkin (10) Patent No.: US 11,677,733 B2
(45) Date of Patent: *Jun. 13, 2023

(54) FIRMWARE VALIDATION FOR ENCRYPTED VIRTUAL MACHINES

(71) Applicant: RED HAT, INC., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/102,159

(22) Filed: Nov. 23, 2020

(65) Prior Publication Data

US 2021/0105260 A1 Apr. 8, 2021

Related U.S. Application Data

(63) Continuation of application No. 15/905,287, filed on Feb. 26, 2018, now Pat. No. 10,848,474.

(51) Int. Cl.
| | | |
|---|---|---|
| G06F 21/57 | (2013.01) | |
| H04L 9/40 | (2022.01) | |
| H04L 9/32 | (2006.01) | |
| H04L 9/08 | (2006.01) | |
| G06F 21/51 | (2013.01) | |
| G06F 9/455 | (2018.01) | |
| G06F 21/44 | (2013.01) | |
| G06F 21/62 | (2013.01) | |

(52) U.S. Cl.
CPC .......... *H04L 63/08* (2013.01); *G06F 9/45558* (2013.01); *G06F 21/44* (2013.01); *G06F 21/51* (2013.01); *G06F 21/572* (2013.01); *G06F 21/575* (2013.01); *H04L 9/088* (2013.01); *H04L 9/3239* (2013.01); *H04L 9/3247* (2013.01); *G06F 21/62* (2013.01); *G06F 2009/45562* (2013.01); *G06F 2221/033* (2013.01)

(58) Field of Classification Search
CPC ....... H04L 63/08; H04L 9/088; H04L 9/3239; H04L 9/3247; G06F 9/45558; G06F 21/44; G06F 21/51; G06F 21/57; G06F 21/572; G06F 21/575; G06F 21/62; G06F 2009/45562; G06F 2221/033
See application file for complete search history.

(56) References Cited

U.S. PATENT DOCUMENTS 8,434,155 B2 4/2013 Sahita et al.
8,650,399 B2 2/2014 Le Bihan et al.
(Continued)

OTHER PUBLICATIONS

Vmware, "Enable or Disable UEFI Secure Boot for a Virtual Machine", Jun. 20, 2017, 4 pages.

*Primary Examiner* — Malcolm Cribbs
(74) *Attorney, Agent, or Firm* — Lowenstein Sandler LLP (57) ABSTRACT

Systems and methods for firmware validation for encrypted virtual machines are disclosed. An example method may include initiating a boot process to launch a virtual machine on a host machine. The virtual machine can be associate with a first firmware. The method may further include authenticating the virtual machine with an external server using the first firmware. The method may further include receiving secret data associated with the virtual machine from the external server. The secret data may be encrypted with an encryption key. The method may further include, responsive to authenticating a second firmware using the first firmware, completing the boot process to launch the virtual machine using the secret data.

20 Claims, 7 Drawing Sheets

(56) References Cited

U.S. PATENT DOCUMENTS

| | | |
|---|---|---|
| 9,317,316 B2 | 4/2016 | Liu |
| 9,852,299 B2 | 12/2017 | Nellitheertha et al. |
| 10,379,894 B1 | 8/2019 | Cruz Oliveira Queiros et al. |
| 2008/0126779 A1 | 5/2008 | Smith |
| 2008/0263345 A1 | 10/2008 | Booth |
| 2010/0023996 A1 | 1/2010 | Sabin |
| 2011/0296201 A1 | 12/2011 | Monclus et al. |
| 2012/0179904 A1 | 7/2012 | Dunn et al. |
| 2012/0266252 A1 | 10/2012 | Spiers et al. |
| 2013/0124840 A1 | 5/2013 | Diluoflo et al. |
| 2013/0152076 A1 | 6/2013 | Patel |
| 2013/0219387 A1 | 8/2013 | Moeller et al. |
| 2013/0232480 A1 | 9/2013 | Winterfeldt et al. |
| 2014/0059541 A1 | 2/2014 | Heninger et al. |
| 2014/0075522 A1 | 3/2014 | Paris et al. |
| 2014/0096134 A1 | 4/2014 | Barak et al. |
| 2016/0140343 A1 | 5/2016 | Novak et al. |
| 2016/0182238 A1 | 6/2016 | Dewan et al. |
| 2017/0228543 A1 | 8/2017 | Jarmany |
| 2018/0359264 A1 | 12/2018 | Sweet et al. |
| 2019/0108007 A1 | 4/2019 | Hia et al. |

FIRMWARE VALIDATION FOR ENCRYPTED VIRTUAL MACHINES

RELATED APPLICATIONS

This application is a continuation of U.S. patent application Ser. No. 15/905,287, filed on Feb. 26, 2018, titled "Firmware Validation For Encrypted Virtual Machines," the entire content of which is incorporated by reference herein.

TECHNICAL FIELD

The disclosure is generally related to virtualization systems, and is more specifically related to firmware validation for encrypted virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for firmware validation for encrypted virtual machines (VMs). Encrypted virtualization provides a security paradigm that protects VMs from physical threats, as well as other VMs and a hypervisor that manages the VMs. In one implementation, encrypted VMs may be provided using a Secure Encrypted Virtualization (SEV) feature set. For example, when encrypted virtualization is enabled, an encryption engine (e.g., firmware, circuitry of a processing device, etc.) of a host machine can associate each encrypted VM hosted by the host machine with a VM-specific key that is not accessible to other VMs or the hypervisor managing the encrypted VM. The VM-specific key may be generated and maintained by the encryption engine and may only be accessible to the encryption engine. Private memory of a VM may be encrypted with the VM-specific key. Accesses to (e.g., reading from or writing to) to the private memory are controlled by the encryption engine. The encryption engine thus provides strong cryptographic isolation between VMs, as well as between the VMs and the hypervisor.

However, a limitation of conventional encrypted virtualization is lack of an efficient firmware validation mechanism for guest launch. As a hypervisor does not have access to VM-specific keys that are used to protect data of encrypted VMs, the hypervisor may lack access to data required to start an encrypted VM. Conventionally, to start an encrypted VM, a host machine may implement an attestation process to prove to a guest owner of the encrypted VM (e.g., a server of an owner of the encrypted VM) that the encrypted VM may be securely launched with encrypted virtualization features enabled. During the attestation process, the guest owner may provide a platform Diffie-Hellman key, session information, a guest policy, etc. to the host machine. A hypervisor running on the host machine may obtain a measurement using the information provided by the guest owner. For example, the hypervisor can create encryption context using the information and encrypting the firmware (e.g., BIOS (Basic Input/output System), UEFI (United Extensible Firmware Interface), etc.) of the virtual machine using the encryption context to generate a hardware hash as the measurement. The hypervisor can transmit the measurement to the guest owner. Upon receiving the measurement from the hypervisor, the guest owner may determine whether the measurement is correct. If the measurement is regarded as being correct, the guest owner can provide secret data (e.g., a disk decryption key) to be used to start the encrypted VM. For example, the hypervisor can initiate a secure network connection to facilitate communication between the encrypted VM and the guest owner. The guest owner can transmit, via the secure network connection, the secret data to the encrypted VM or to the hypervisor for injection into the encrypted VM. The firmware (e.g., BIOS, UEFI) may have to be made available to the guest owner. Any change or update to the firmware (e.g., by the hypervisor) may also have to be made available to the guest owner. Any change or update to the firmware (e.g., BIOS, UEFI) may require implementation of the attestation process to validate the change in the firmware with the guest owner. This may involve generating a new hardware hash representing the change in the firmware. As such, access to the firmware is required to validate any change in the firmware.

Aspects of the disclosure address the above deficiencies and other deficiencies by providing mechanisms (e.g., systems, methods, machine-readable media, etc.) for firmware validation for encrypted VMs. To launch a virtual machine on a host machine, the mechanisms can start the virtual machine to include a first firmware on the host machine. The first firmware of the virtual machine can perform a first validation process to authenticate the virtual machine with the guest owner of the virtual machine. For example, the first firmware may generate a measurement representing a state of the virtual machine. The measurement may be, for example, a hash of contents of a memory associated with the virtual machine. The measurement can be transmitted to the guest owner (e.g., by a hypervisor running on the host machine).

Upon receiving the measurement, the guest owner can determine whether the measurement is valid. The guest owner can then send one or more messages to the hypervisor indicating the validity or invalidity of the measurement and/or whether the virtual machine is authenticated by the guest owner.

In some embodiments, in response to receiving a message indicating that the measurement is invalid, the hypervisor can stop the virtual machine on the host machine. Alternatively, the hypervisor may receive, from the guest owner, a message indicating that the measurement is valid and/or that the virtual machine is authenticated by the guest owner. The hypervisor can pass the message to the virtual machine. The virtual machine can receive secret data associated with the virtual machine. The secret data may be encrypted data that can be used for booting and/or executing the virtual machine on the host machine. In one implementation, the virtual machine can receive the secret data from the guest owner over a secure networking channel (e.g., a secure socket). In another example, the hypervisor can receive the secret data from the guest owner and can inject the secret data into the virtual machine.

The first firmware of the virtual machine can load a second firmware of the virtual machine. The second firmware may be, for example, BIOS (Basic Input/Output System), UEFI (United Extensible Firmware Interface), and/or any other firmware that can perform hardware initialization during a boot process of the virtual machine, provide runtime services for an operating system of the virtual machine and/or programs running on the virtual machine.

The first firmware can also perform a second validation process to validate the second firmware. For example, the first firmware may determine that the second firmware is valid in response to determining that the second firmware is signed using a predetermined key (e.g., a private key that matches a public key associated with the first firmware), that the second firmware is signed by a predetermined entity (e.g., a particular cloud provider, a particular hypervisor manufacturer, a hardware manufacturer, etc.), that the second firmware is valid in response to determining that the second firmware is signed using a predetermined digital signature, and/or that the second firmware satisfies any other criteria that indicates the authenticity of the second firmware.

Implementations of the disclosure provide a technical improvement over the conventional systems by providing a firmware validation mechanism that enables validated initialization of encrypted VMs. Compared to conventional firmware validation schemes that rely on a hardware hash provided by a standard firmware (e.g., BIOS, UEFI) of a virtual machine, the mechanisms disclosed herein implementing a software validation scheme that validates the standard firmware using the first firmware as disclosed herein. Unlike the conventional firmware validation schemes, the mechanisms disclosed herein do not have to boot an operating system of the virtual machine or access the standard firmware for firmware validation. Rather, the mechanisms disclosed herein may access the first firmware for firmware validation. As the functionality of the first firmware is limited to firmware validation, changes to the first firmware may be rare. This may reduce needs for updated attestation with the guest owner. Accordingly, the firmware validation of encrypted virtual machines is simplified, resulting in simplified management and installation of the encrypted virtual machines.

As used herein, "firmware" may refer to software provided to a virtual machine by a host machine (e.g., by a hypervisor of the host machine, a hardware component of the host machine, etc.) and may include any of firmware, software, hardware, or a combination thereof.

Figure 1:
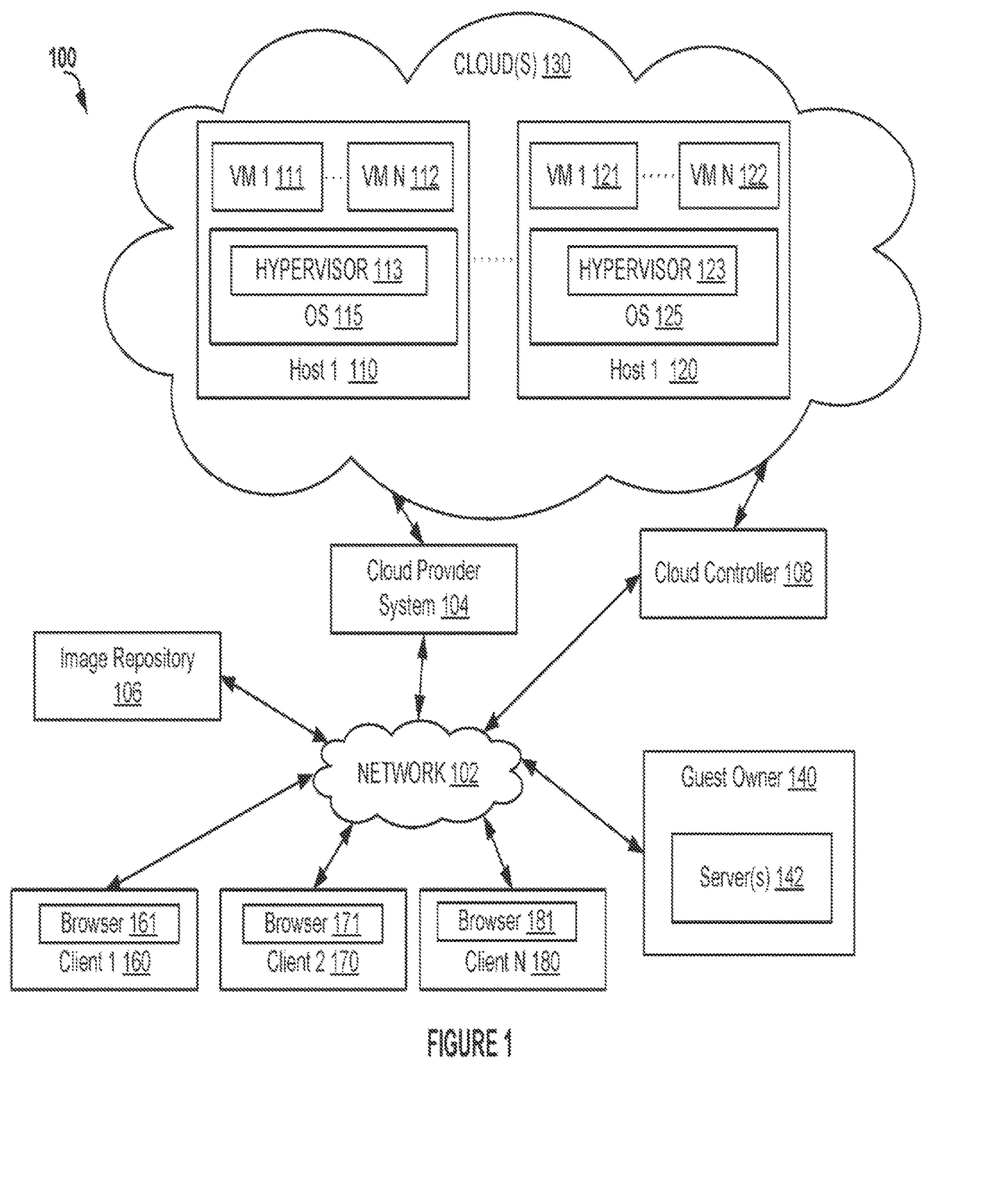
FIG. 1 depicts a schematic diagram illustrating an example computing system in accordance with one or more aspects of the disclosure.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Network architecture 100 is also referred to as system 100 herein. Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 may include a cloud-computing environment 130 (also referred to herein as a cloud) that includes one or more host machines 110, 120, etc. to execute applications and/or processes associated with the applications. In some other implementations, the host machines may be independent systems that are capable of communicating via a network. Each of the host machines can include one or more computing devices (e.g., a computing device described in connection with FIG. 7).

A host machine 110 can host one or more VMs (e.g., VMs 111, 112) and can execute an operating system 115 ("host OS") to manage its resources. A host machine 120 can host one or more VMs (e.g., VM 121, VM 122) and can execute an operating system 125 ("host OS") to manage its resources. Each of VMs 111, 112, 121, 122 can execute a guest OS (not shown). In one embodiment, the host machine 110 executes a hypervisor 113 to virtualize access to underlying source host hardware, making the use of a VM running on the host machine 110 transparent to the guest OS running on the VM and users (e.g., a system administrator) of the host 110. The host machine 120 may execute a hypervisor 123 to virtualize access to underlying source host hardware, making the use of a VM running on the host 120 transparent to the guest OS running on the and users (e.g., a system administrator) of the host 120.

In some embodiments, each of host machines 110, 120 may include a host machine as described in connection with FIG. 2. One or more of VMs 111, 112, 121, 122 may be an encrypted virtual machine as descried in connection with FIG. 2.

In some implementations, the host machines 110, 120 may be located in a data center. Users can interact with applications executing on the VMs 111, 112, 121, 122 using client computer systems, such as clients 160, 170 and 180, via corresponding web browser applications 161, 171 and 181. In other implementations, the applications may be hosted directly on hosts 1 through N 110, 120 without the use of VMs (e.g., a "bare metal" implementation).

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each host machines 110, 120. This data may be used for the execution of applications for a multi-tenant PaaS system managed by the PaaS provider controller 140.

In one implementation, the data associated with the application may include data used for execution of one or more containers that include application images built from pre-existing application components and source code of users managing the application. As used herein, an image may refer to data representing executables and files of the application used to deploy functionality for a runtime instance of the application. In one implementation, the image can be built using suitable containerization technologies (e.g., using a Docker tool).

System 100 can also include a guest owner 140 including one or more servers 142 of an owner of one or more of VMs 111, 112, 121, 122. Server(s) 142 may include one or more computing devices, such as a computing device described in connection with FIG. 7. Guest owner 140 and/or server(s) 142 can manage data associated with VMs 111, 112, 121, 122. For example, guest owner 140 and/or server(s) 142 can store and/or manage secret data that can be used to boot and/or execute VMs 111, 112, 121, 122. The secret data of a virtual machine may be encrypted data encrypted using an encryption key associated with the virtual machine. In some embodiments, a hypervisor (e.g., hypervisor 113, 123) that manages the virtual machine does not have access to the encryption key.

In some embodiments, server(s) 142 can send a request to launch a virtual machine (VM 111) to a host machine (e.g., host 110). In response to receiving the request, a hypervisor of the host machine (e.g., hypervisor 113) can start the virtual machine including a first firmware on the host machine. The first firmware of the virtual machine can perform a first validation process to authenticate the virtual machine with guest owner 140 and/or server(s) 142. For example, the first firmware may generate a measurement representing a state of the virtual machine. The measurement may be, for example, a hash of contents of a memory associated with the virtual machine. The hypervisor of the host machine can transmit the measurement to the guest owner 140 and/or server(s) 142.

Upon receiving the measurement, guest owner 140 and/or server(s) 142 can determine whether the measurement is valid. For example, server(s) 142 can compare the received measurement with a predefined measurement associated with the virtual machine. Server(s) 142 can determine that the received measurement is valid in response to determining that the received measurement matches the predefined measurement. Alternatively, server(s) 142 can determine that the received measurement is invalid in response to determining that the received measurement does not match the predefined measurement. Server(s) 142 can then send one or more messages to the hypervisor indicating the validity or invalidity of the measurement and/or whether the virtual machine is authenticated by guest owner 140.

In some embodiments, in response to receiving a message indicating that the measurement is invalid, the hypervisor can stop the virtual machine on the host machine. Alternatively, the hypervisor may receive, from the server(s) 142 a message indicating that the measurement is valid and/or that the virtual machine is authenticated by the guest owner 140. The hypervisor can pass the message to the virtual machine.

The virtual machine can receive secret data associated with the virtual machine from server(s) 142. In one implementation, the virtual machine can receive the secret data from server(s) 142 via a secure networking channel (e.g., a secure socket). In another example, the hypervisor can receive the secret data from server(s) 142 and can inject the secret data into the virtual machine.

The first firmware of the virtual machine can load a second firmware of the virtual machine. In some embodiments, the second firmware is loaded after the receipt of the secret data by the virtual machine. The second firmware can perform hardware initialization during the boot process, provide runtime services for an operating system of the virtual machine and/or programs running on the virtual machine, and/or perform other operations to execute the virtual machine on the host machine. The second firmware may be, for example, BIOS (Basic Input/Output System), UEFI (United Extensible Firmware Interface), etc.

The first firmware can also perform a second validation process to validate the second firmware. For example, the first firmware may determine that the second firmware is valid in response to determining that the second firmware is signed using a predetermined key (e.g., a private key that matches a public key associated with the first firmware), that the second firmware is signed by a predetermined entity (e.g., a particular cloud provider), and/or that the second firmware satisfies any other criteria that indicates the authenticity of the second firmware.

In some embodiments in which the second firmware is valid, the second firmware can complete a boot process of the virtual machine on the host machine using the supplied secret. Alternatively, the virtual machine may be stopped on the host machine in some embodiments in which the second firmware is invalid.

Figure 2:
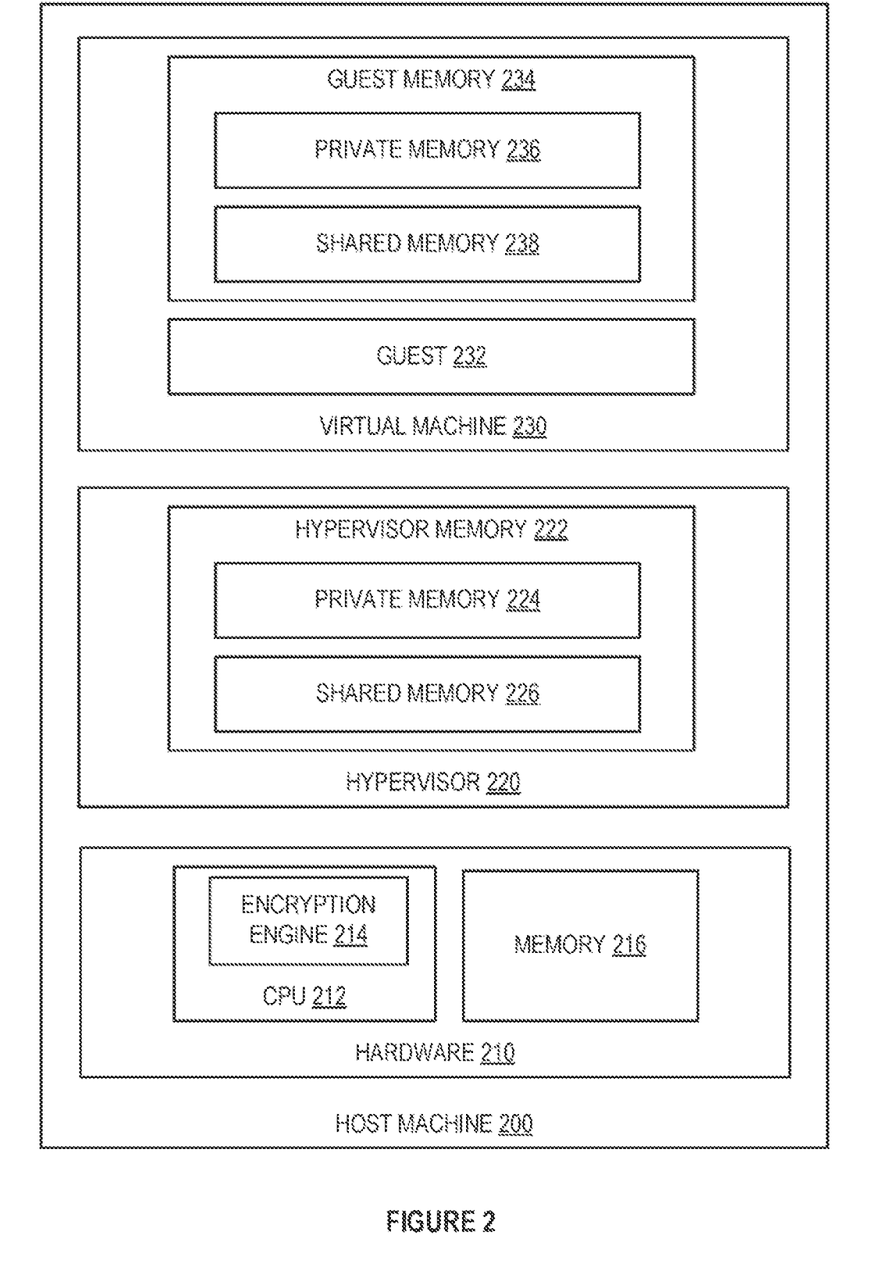
FIG. 2 schematically illustrates an example of a host machine implementing encrypted virtualization according to some implementations of the disclosure.

FIG. 2 is a block diagram depicting an example 200 of a host machine implementing encrypted virtualization in accordance with an implementation of the disclosure. In one implementation, host machine 200 is the same as or similar to host machines 110 and/or 120 as described with respect to FIG. 1. As illustrated, host machine may include hardware 210, a hypervisor 220, a virtual machine 230, and/or any other suitable component. In one implementation, hypervisor 220 is the same as hypervisor 113 and/or hypervisor 123 as described with respect to FIG. 1. More or fewer components than illustrated as part of host machine 200 in FIG. 2 may be implemented in host machine 200, and implementations of the disclosure are not limited to those specifically described and illustrated herein.

Hardware 210 may include CPU 212, memory 216, one or more I/O devices (not shown), etc. One or more processors may be embodied as CPU 212, which can be and/or include a micro-processor, digital signal processor (DSP), or other processing component. CPU 212 may process various received data and may carry out the code or instructions or one or more computer programs, for example, to provide input/output operations specified by the instructions. It should be noted that the fact that a single CPU 212 is depicted in FIG. 2 is merely illustrative, and that in some other examples host machines 200 may comprise a plurality of CPUs.

Memory 216 may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.).

CPU 212 may further include an encryption engine 214 that provides an encrypted virtualization mechanism that encrypts one or more of VMs hosted on host machine 200 to protect the VMs from physical threats, as well as from other VMs and hypervisor 220. In one implementation, the encryption engine 214 may be implemented as hardware circuitry of the CPU 212. In some implementations, encryption engine 214 may be provided as firmware installed on the host machine 200. The encryption engine 214 may implement a Secure Encrypted Virtualization (SEV) feature set provided by Advanced Micro Devices (AMD®). A VM protected by the encrypted virtualization mechanism is also referred to herein as an "encrypted virtual machine" or "encrypted VM."

When encrypted virtualization is enabled, the encryption engine 214 can tag all code and data with a VM identifier (ID) that indicates which VM that the data originated from or is intended for. This tag is kept with the data and prevents that data from being used by anyone other than the owner. Private memory of an encrypted VM may be encrypted with a VM-specific key. The VM-specific key is associated with the encrypted VM and is not accessible to a hypervisor managing the encrypted VM or any other virtual machine. The VM-specific key may be associated with a VM ID of the encrypted VM. In some embodiments, the VM-specific key may be generated and maintained by the encryption engine 214. Accesses to the memory page may be encrypted and/or decrypted by encryption engine 214. As such, the encryption engine 214 may provide cryptographic isolation between VMs, as well as between the VMs and a hypervisor managing the VMs.

In some embodiments, host machine 200 may host one or more encrypted VMs and/or one or more unencrypted VMs. For example, host machine 200 may host an encrypted VM 230 and one or more unencrypted VMs. As another example, each of the virtual machines hosted by host machine 200 may be an encrypted VM. Host 200 may host any suitable number of encrypted VMs and/or unencrypted VMs.

Hypervisor 220 may abstract components of hardware 210 (e.g., CPU 212, memory 216, I/O devices, etc.), and present this abstraction to virtual 230 and one or more other virtual machines hosted by host machine 200 as virtual devices, such as virtual processors, virtual memory, virtual I/O devices, etc. Hypervisor 220 may include hypervisor memory 222. In some embodiments, hypervisor memory 222 may include private memory 224 and shared memory 226. Private memory 224 may be encrypted with an encryption key that is accessible to hypervisor 220 but inaccessible to virtual machine 230 or other virtual machine running on host machine 200 (also referred to as the "hypervisor key"). Shared memory 226 may be accessible to hypervisor 220, virtual machine 230, and/or other device that is granted access to shared memory 226. In some embodiments, shared memory 226 may be encrypted with an encryption key that is accessible to hypervisor 220 and virtual machine 230. Hypervisor 220 can use shared memory 226 to communicate with virtual machine 230 and/or one or more other virtual machines that have access to shared memory 226. For example, to transmit certain data to virtual machine 230, hypervisor 220 can store the data in shared memory 226. Guest 232 can then retrieve the data from shared memory 226.

Virtual machine 230 can execute a guest operating system (also referred to as "guest") 232 which may utilize the underlying virtual devices, including virtual processors, virtual memory (e.g., guest memory 234), and virtual I/O devices. One or more applications and/or services may be running on virtual machine 230 under the guest operating system.

Hypervisor 220 may map a virtual resource or state (e.g., registers, memory, files, etc.) to physical resources of host machine 200. For example, hypervisor 220 can present a guest memory 234 to guest 232. Hypervisor 220 may map the memory location of guest memory 234 to physical memory locations of memory 216. Guest memory 234 may store state information of guest 232 that may be mapped to physical memory locations of memory 216.

In some embodiments, virtual machine 230 may be an encrypted virtual machine. Guest memory 234 may include private memory 236 that is encrypted with an encryption key associated with the virtual machine (also referred to as the "VM-specific key"). The VM-specific key may be generated and/or managed by encryption engine 214. The VM-specific key is not accessible to hypervisor 220, other virtual machine running on host machine 200, or any other device. The VM-specific key may be generated and/or managed by encryption engine 214. For example, contents of private memory 236 may be encrypted and/or decrypted by encryption engine 214 using the VM-specific key. In some embodiments, encryption engine 214 may identify a particular memory page as a page of private memory 238 (e.g., by determining that a bit of an address of the memory page (e.g., a physical address) indicates that encrypted virtualization is enabled for the memory page). Accesses to the memory page (e.g., writing to or reading from the memory page) may then be encrypted and decrypted by encryption engine 214 using the VM-specific key.

Guest memory 234 may also include shared memory 238. Shared memory 238 may be accessible to hypervisor 220 and/or one or more other devices that have been granted access to shared memory 238. For example, shared memory 238 may be encrypted with an encryption key that is accessible to hypervisor 220 and virtual machine 230. The virtual machine 230 can use shared memory 238 to communicate with hypervisor 220 and/or one or more other virtual machines that have access to shared memory 238. For example, to transmit certain data to hypervisor 220, guest 232 can store the data in shared memory 238. Hypervisor 220 can then retrieve the data from shared memory 238.

In some embodiments, guest 232 can designate one or more particular portions of the guest memory 210 as being protected as private memory. For example, guest 232 can select one or more pages of guest memory 234 to be encrypted with the VM-specific key. Guest 232 can also select one or more pages of guest memory 234 as being shared memory 238. In some embodiments, host machine 200 may require certain types of memory (e.g., instruction pages, page tables, etc.) to be private to protect virtual machine 230.

Figure 3:
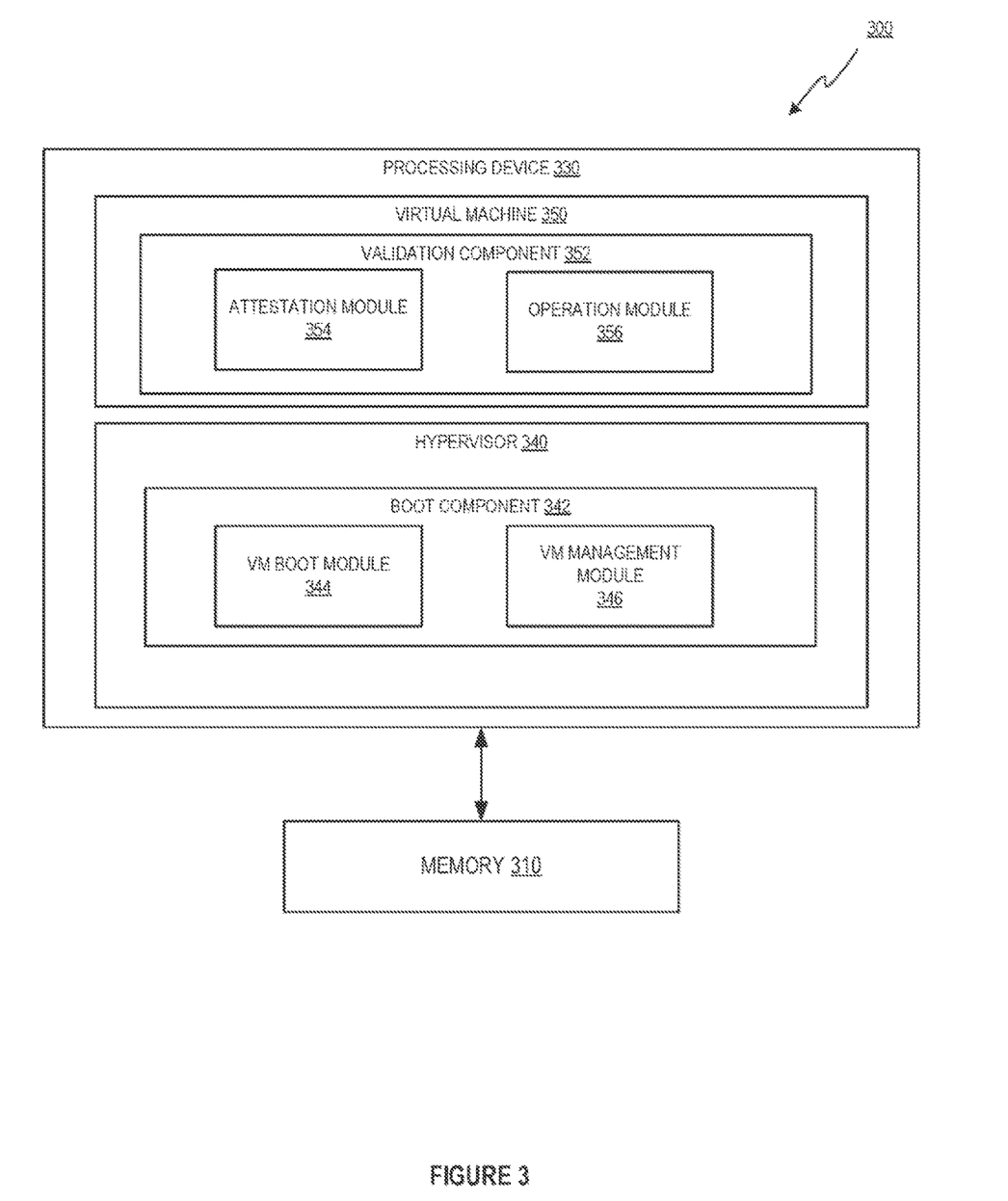
FIG. 3 is a block diagram illustrating an example of a computing device in accordance with one or more aspects of the disclosure.

FIG. 3 illustrates an example computing device 300 in which implementations of the disclosure may operate. Computing device 300 may be the same or similar to the host machine 101 within virtualization system 100 described with respect to FIG. 1. Computing device 300 may include components and modules for firmware validation for encrypted VMs. The computing device 300 may include a memory 310 that can store VM memory pages. In one implementation, the VM memory pages may be memory (e.g., a page cache) of computing device 300 virtualized for use by encrypted VM 350. One or more memory pages may be an encrypted memory page, such as a page of a private memory 236 as described in connection with FIG. 2.

Computing device 300 may include a processing device 330 with a hypervisor 340 and a VM 350. In some embodiments, VM 350 may be an encrypted VM as described in accordance with the present disclosure. Hypervisor 340 may include a boot component 342 for booting and/or managing VM 350 and one or more other VMs hosted by the computing device 300. Boot component 342 can include a VM boot module 344, a VM managing module 346, and/or any other suitable component for performing firmware initialization in accordance with the present disclosure. In some embodiments, boot component 342 can receive a request for launching VM 350 on the computing device 300. The request may be initiated by a guest owner (e.g., a server of an owner of the encrypted VM) or any other suitable device.

VM boot module 344 can initiate a boot process for the VM 350. For example, the VM boot module 344 can start the VM 350 to include a first firmware of the VM 350. The first firmware may provide firmware validation functionality in accordance with the present disclosure. For example, the first firmware may perform operations to prove to the guest owner of the VM 350 that the VM 350 may be securely launched with encrypted virtualization features enabled. The first firmware does not load an operating system of the VM 350 in some embodiments. In some embodiments, the first firmware may run on a single CPU and may use minimal or limited hardware resources (e.g., a set of CPU registers that are sufficient to implement the firmware validation mechanisms disclosed herein). In some embodiments, the first firmware may be and/or include a shim. In one implementation, the boot module 446 can initiate the boot process by providing, to the VM 350, bootstrap instructions that cause VM 350 to perform the boot process when executed within the VM 350. In another implementation, the boot module 446 can initiate the boot process by installing a boot image defining an operating system, utilities and diagnostics, boot and data recovery information, etc. of the VM 350.

Attestation module 354 can perform a first validation process to prove to the guest owner of the VM 350 that the VM 350 may be securely launched with encrypted virtualization features enabled. For example, attestation module 354 can obtain a measurement representative of a state of the VM 350. The measurement may be a hash of contents of a memory of the VM 350 (e.g., a guest memory of the VM 350 as described in connection with FIG. 2). Attestation module 354 can then transmit the measurement to hypervisor 340 for transmission to the guest owner. For example, VM management module 346 can transmit the measurement to the guest owner. In some embodiments, attestation module 354 may be implemented by the first firmware.

VM management module 346 may receive, from the guest owner, a message indicating whether the measurement is valid. In one implementation, the message may indicate that the measurement is invalid. The message may also indicate one or more operations to be performed with respect to the VM 350 (e.g., stopping the VM 350). Hypervisor 340 may then perform the operations.

In another implementation, the message may indicate that the measurement is valid. The guest owner may transmit secret data associated with VM 350 to VM 350. In one implementation, VM 350 (e.g., operation module 356) may receive the secret data from the secret data via a secure communication channel. In another implementation, VM management module 346 can receive the secret data and can inject the secret data into the VM 350. The secret data may include any suitable data that can be used to boot and/or operate VM 350. The secret data may include, for example, a cryptographic key that can be used to access encrypted data to be used to complete the boot process. The cryptographic key can be and/or include, for example, a disk decryption key that can be used to decrypt and/or access encrypted data stored in a virtual disk associated with VM 350. The secret data may be encrypted data encrypted using an encryption key that is not accessible to the hypervisor 340. As such, the hypervisor 340 cannot read the contents of the secret data even when the hypervisor 340 possesses the secret data.

Upon the receipt of the secret data by the VM 350, operation module 356 can upload a second firmware of the VM 350. The second firmware can perform hardware initialization during the boot process, provide runtime services for operating system of VM 350 and/or programs running on VM 350, and/or perform other operations to execute VM 350 on computing device 300. The second firmware may be, for example, BIOS (Basic Input/Output System), UEFI (United Extensible Firmware Interface), etc.

Operation module 356 can perform a second validation process to validate the second firmware. For example, operation module 356 can determine whether the second firmware is signed using a particular key and can determine that the second firmware is valid in response to determining that the second firmware is signed using the particular key. The particular key may be, for example, a private key that matches a public key included in the first firmware. As another example, the operation module 356 can determine whether the second firmware is signed by a particular party (e.g., a particular cloud provider, a hardware manufacturer, a hypervisor manufacturer, etc.) and can determine that the second firmware is valid in response to determining that the second firmware is signed by the particular party.

In some embodiments, in response to determining that the second firmware is invalid, the operation module 356 may send, to VM management module 346, a notification indicating that the second firmware is invalid. VM management module 346 can then stop VM 350, send the notification to the guest owner, and/or perform any other suitable operation with respect to VM 350. Alternatively, the operation module 356 can determine that the second firmware is valid and can send a notification to VM management module 346 to indicate such determination. Operation module 356 can also perform one or more operations to complete the boot process. For example, operation module 356 can access data stored in an encrypted disk associated with VM 350 using the secret data (e.g., by decrypting the data using the cryptographic keys or any other secret data), such as instructions defining the guest OS. The operation module 356 can execute the guest OS using the data. In some embodiments, the operation module 356 may send, to hypervisor 340 (e.g., boot component 346), a notification indicative of the completion of the boot process.

Figure 4:
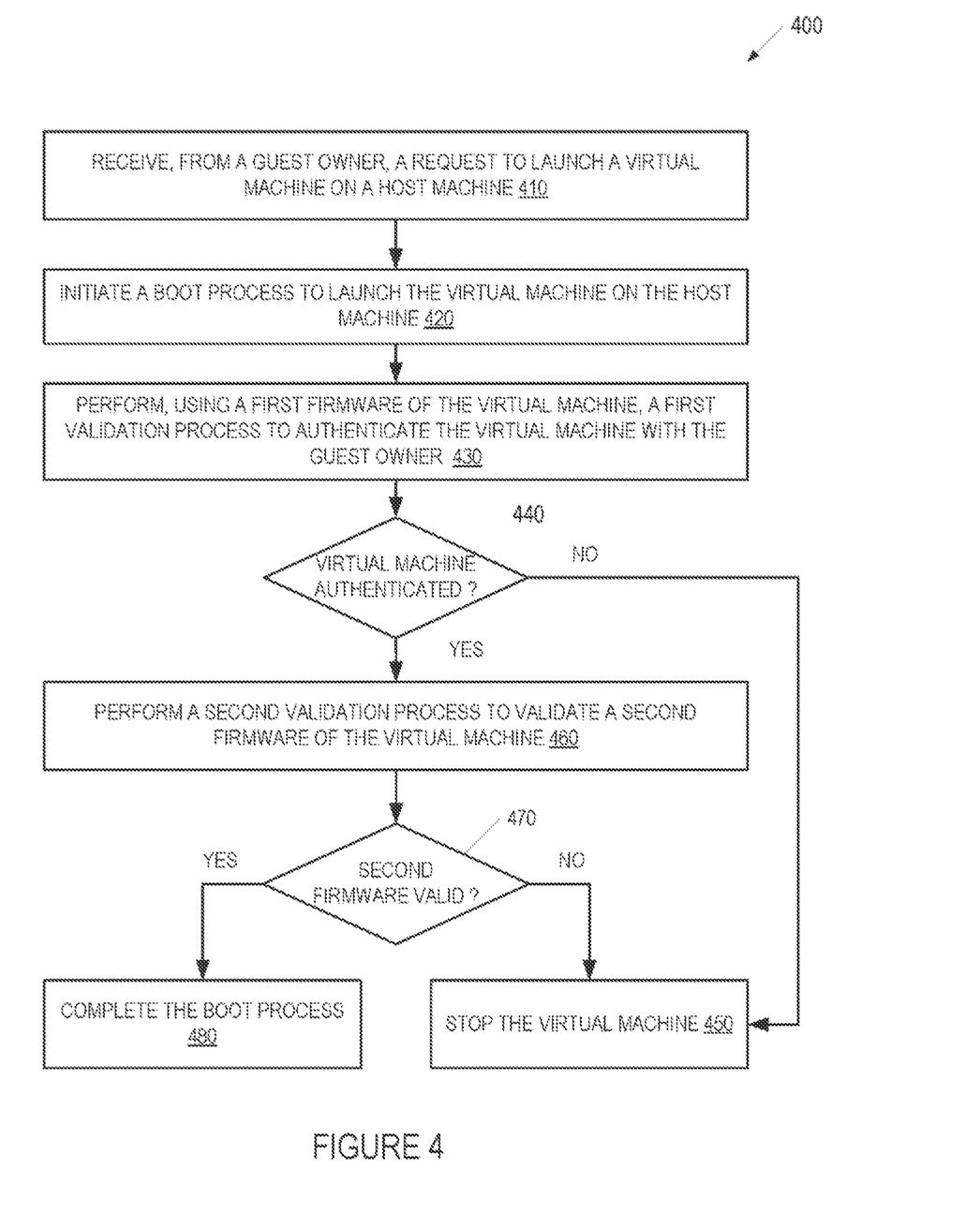
FIG. 4 depicts a flow diagram of a method of firmware validation for encrypted virtual machines in accordance with one or more aspects of the disclosure.
Figure 5:
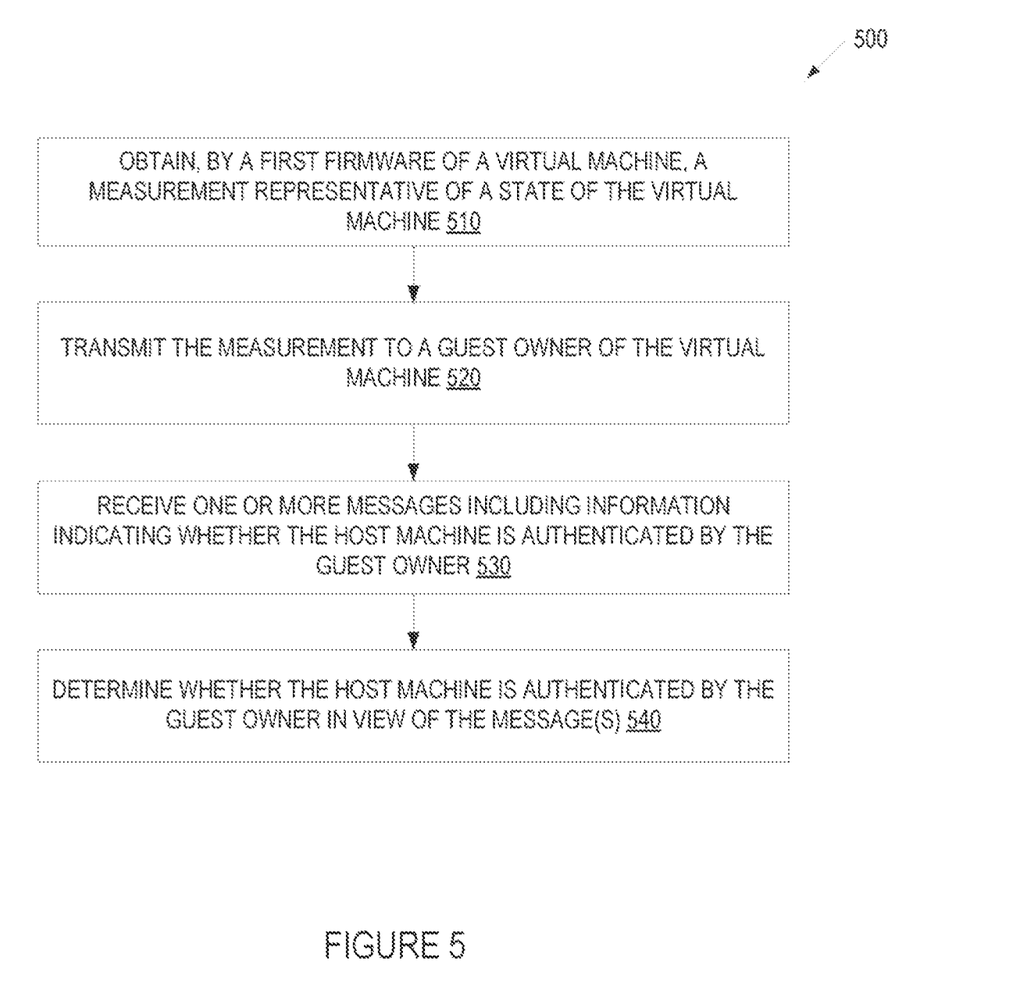
FIG. 5 depicts a flow diagram of a method of validating a virtual machine by a first firmware of the virtual machine in accordance with one or more aspects of the disclosure.
Figure 6:
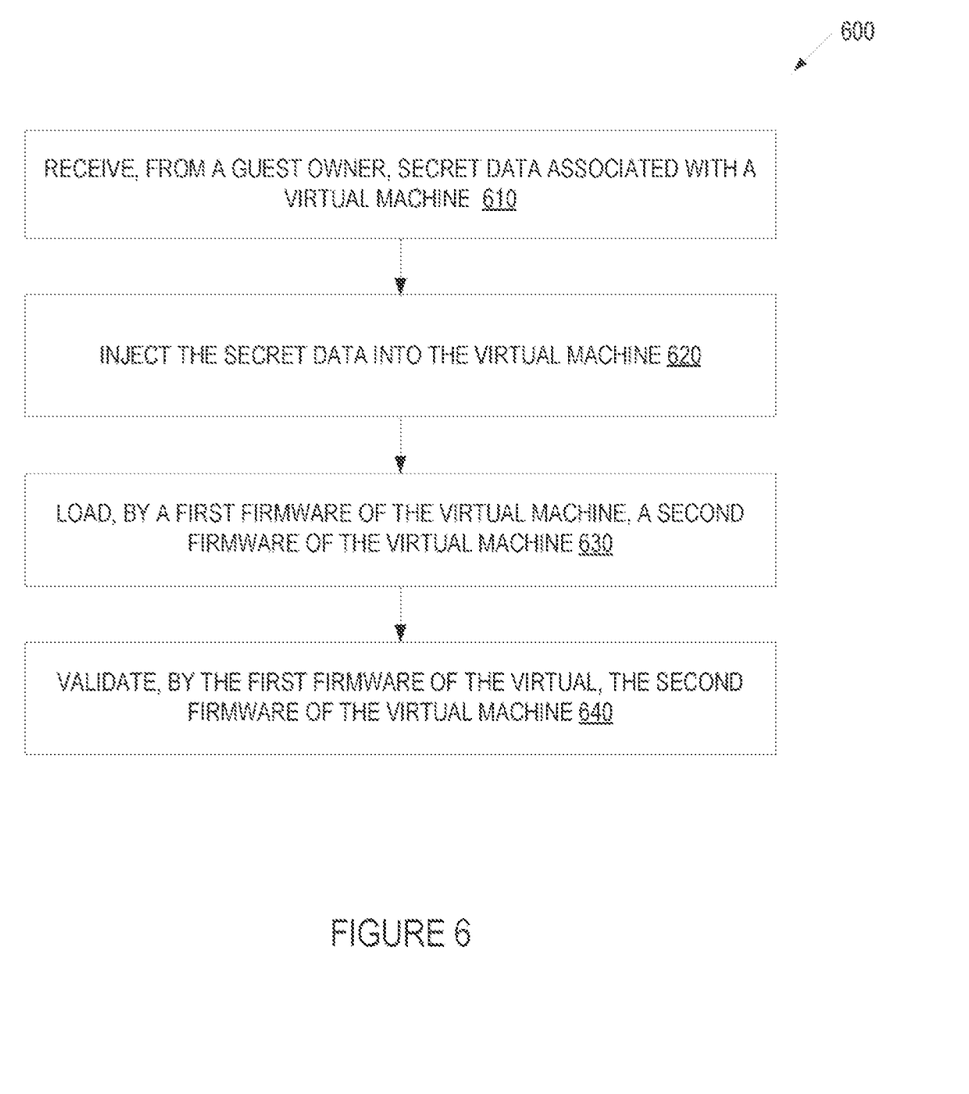
FIG. 6 depicts a flow diagram of a method of validating a second firmware of a virtual machine using a first firmware of the virtual machine in accordance with one or more aspects of the disclosure.

FIGS. 4, 5, and 6 depict flow diagrams for illustrative examples of methods 400, 500, and 600 for firmware validation for encrypted VMs. Method 400 includes a method of firmware validation for encrypted VMs. Method 500 includes a method of a first validation process for validating a host machine. Method 600 includes a method of a second validation process for validating a firmware of a virtual machine. Methods 400, 500, and 600 may be performed by processing devices that may comprise hardware (e.g., circuitry, dedicated logic), computer readable instructions (e.g., run on a general purpose computer system or a dedicated machine), or a combination of both. Methods 400, 500, and 600 and each of their individual functions, routines, subroutines, or operations may be performed by one or more processors of the computer device executing the method. In certain implementations, methods 400, 500, and 600 may each be performed by a single processing thread. Alternatively, methods 400, 500, and 600 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In some embodiments, methods 400, 500, and 600 may be performed by a kernel of a hypervisor as shown in FIG. 1 or by an executable code of a host machine (e.g., a host operating system or firmware), an executable code of a virtual machine (e.g., a guest operating system or virtual firmware), or any other executable code, or a combination thereof.

Referring to FIG. 4, method 400 may begin at block 410, where a processing device of a host machine may receive, from a guest owner, a request to launch a virtual machine on the host machine. At block 420, the hypervisor can initiate a boot process to launch the virtual machine on the host machine. For example, the hypervisor can start the virtual machine with a first firmware of the virtual machine. The first firmware may be a firmware that can perform operations to prove to the guest owner that the virtual machine may be securely launched with encrypted virtualization features enabled. The first firmware may include a shim firmware in some embodiments.

At block 430, the processing device can perform a first validation process to authenticate the virtual machine with the guest owner. The first validation process may be performed using the first firmware. For example, the first firmware can generate a measurement representative of a state of the virtual machine (e.g., by generating a hash of contents of a memory associated with the virtual machine). The processing device can then transmit the measurement to the guest owner to validate the host machine. In some embodiments, the first validation process may be performed by performing one or more operations as described in connection with FIG. 5. Block 430 can be performed by the attestation module 354 of FIG. 3 in some embodiments.

At block 440, the processing device may determine a first result of the first validation process. The first result may be, for example, that the virtual machine is authenticated by the guest owner or that the virtual machine is not authenticated by the guest owner. In some embodiments, the processing device can receive, from the guest owner, one or more messages indicating whether the virtual machine is authenticated by the owner. The processing device can then determine the first result based on the messages.

In some embodiments, the processing device can proceed to block 450 in response to determining that the virtual machine is not authenticated by the guest owner. At block 450, the processing device can stop the virtual machine on the host machine. The processing device can also perform one or more other operations with respect to the virtual machine (e.g., an operation requested by the guest owner).

In some embodiments, the processing device can proceed to block 460 in response to determining that the virtual machine is authenticated by the guest owner. At block 460, the hypervisor may perform a second validation process to validate a second firmware of the virtual machine. The second firmware may be BIOS, UEFI, and/or any other firmware that can perform hardware initialization during the boot process, provide runtime services for operating system of the virtual machine and/or programs running on the virtual machine, etc. The second validation process may be performed by the first firmware in some embodiments. The processing device can perform the second validation process by determining whether the second firmware is signed by a particular entity, whether the second firmware is signed using a particular key, etc. In some embodiments, the second validation process may be performed by performing one or more operations described in connection with FIG. 6.

At block 470, the processing device can determine a result of the second validation process and can determine whether the second firmware is valid. In some embodiments, the processing device can proceed to block 450 in response to determining that the second firmware is invalid (e.g., by determining that the second firmware is not signed by the particular entity or using the particular key).

In some embodiments, in response to determining that the second firmware is valid (e.g., by determining that the second firmware is signed by the particular entity or using the particular key), the processing device can proceed to block 480. At block 480, the processing device can perform one or more operations to complete the boot process. For example, the processing device can access data stored in an encrypted disk associated with the virtual machine using the secret data (e.g., by decrypting the data using the cryptographic keys or any other secret data), such as instructions defining a guest OS of the virtual machine. The processing device can execute the guest OS using the data.

Referring to FIG. 5, method 500 may begin at block 510, where a first firmware of the virtual machine may obtain a measurement representative of a state of the virtual machine. The first firmware may be a firmware that can perform operations to prove to the guest owner that the virtual machine may be securely launched with encrypted virtualization features enabled. The first firmware may include a shim firmware in some embodiments. The measurement may include, for example, a hash of contents of a memory associated with the virtual machine.

At block 520, the processing device can transmit the measurement to a guest owner of the virtual machine. At block 530, the processing device can receive, from the guest owner, one or more messages including information indicating whether the virtual machine is authenticated by the guest owner. In some embodiments, the message(s) may include information indicating whether the measurement is valid. The message(s) may also include secret data associated with the virtual machine in some embodiments.

At block 540, the processing device can determine whether the virtual machine is authenticated by the guest owner in view of the messages. For example, the processing device can determine that the virtual machine is authenticated by the guest owner in response to determining that measurement is valid. Alternatively, the processing device can determine that the virtual machine is not authenticated by the guest owner in response to determining that the measurement is invalid.

Referring to FIG. 6, method 600 may begin at block 610, where a processing device of a host machine can receive, from a guest owner, secret data associated with a virtual machine. The secret data may be received from the guest owner. The secret data may be and/or include any data that can be used to complete the boot process and/or to execute the virtual machine on the host machine. For example, the secret data may include a cryptographic key that can be used to access encrypted data to be used to complete the boot process. The cryptographic key may be a disk decryption key for accessing an encrypted disk associated with the virtual machine. The secret data may be encrypted with an encryption key that is not accessible to the hypervisor.

At block 620, the processing device can inject the secret data into the virtual machine in one implementation. In another implementation, the virtual machine may receive the secret data from the guest owner. Block 620 may thus be omitted.

At block 630, the processing device may load a second firmware of the virtual machine. The second firmware may be BIOS, UEFI, and/or any other firmware that can perform hardware initialization during the boot process, provide runtime services for an operating system of the virtual machine and/or programs running on the virtual machine, etc. In some embodiments, the second firmware may be loaded by the first firmware of the virtual machine as described in connection with FIGS. 1-5.

At block 640, the processing device can validate the second firmware of the virtual machine (e.g., using the first firmware of the virtual machine). The validation may be performed in accordance with any suitable scheme for determining the authenticity of the second firmware. For example, the processing device can validate the second firmware by determining whether the second firmware is signed using a predetermined signature, by a predetermine entity, etc.

Figure 7:
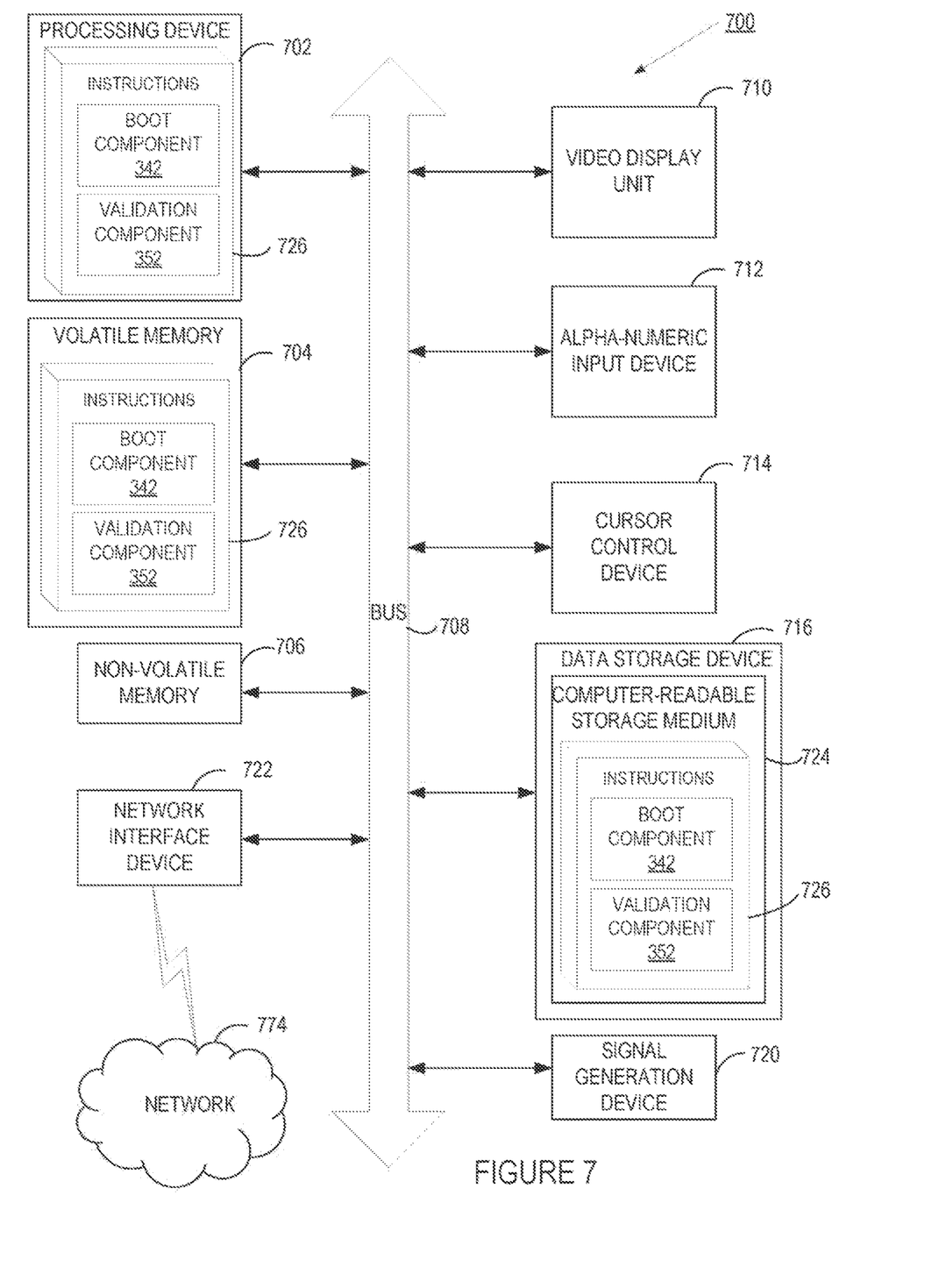
FIG. 7 depicts a block diagram of an illustrative computing device operating in accordance with the examples of the disclosure.

FIG. 7 depicts a block diagram of a computer system operating in accordance with one or more aspects of the disclosure. In various illustrative examples, computer system 700 may correspond to a computing device, such as computer system 700 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for a boot component 342 and a validation component 352 of FIGS. 1, 2 and 3 for implementing methods 400, 500 and/or 600 of FIGS. 4, 5, and 6.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: receiving, by a processing device, a request to launch a virtual machine on a host machine; starting, on the host machine, the virtual machine comprising a first firmware and a second firmware; performing, using the first firmware, a first validation process to authenticate the virtual machine with a server of a guest owner; and performing, using the first firmware, a second validation process to validate the second firmware of the virtual machine.

Example 2 includes the subject matter of example 1, further comprising receiving, by the processing device, secret data associated with the virtual machine, wherein the secret data is encrypted with an encryption key inaccessible to a hypervisor managing the virtual machine.

Example 3 includes the subject matter of example 2, further comprising receiving, by the virtual machine, the secret data prior to performing the second validation process.

Example 4 includes the subject matter of example, wherein the secret data comprises data to be used to boot the virtual machine on the host machine.

Example 5 includes the subject matter of example 1, wherein the first firmware comprises a shim firmware.

Example 6 includes the subject matter of example 1, wherein the second firmware comprises at least one of BIOS (Basic Input/Output System) or UEFI (United Extensible Firmware Interface).

Example 7 includes the subject matter of example 1, wherein performing the first validation process further comprises: obtaining a measurement representative of a state of the virtual machine; and transmitting the measurement to the server of the guest owner.

Example 8 includes the subject matter of example 7, wherein the measurement comprises a hash of contents of a memory associated with the virtual machine.

Example 9 includes the subject matter of example 1, wherein performing the second validation process comprises determining whether the second firmware is signed by a predetermined entity.

Example 10 includes the subject matter of example 1, wherein performing the second validation process comprises determining whether the second firmware is signed using a predetermined key.

Example 11 includes the subject matter of example 10, wherein the first firmware comprises a public key, and wherein the predetermined key comprises a private key matching the public key.

Example 12 includes a method comprising: obtaining, using a first firmware of a virtual machine, a measurement representative of a state of the virtual machine; transmitting, by a processing device of a host machine, the measurement to a server of a guest owner associated with the virtual machine; receiving, from the server of the guest owner, a message indicating whether the measurement is valid; and performing a validation process to validate a second firmware of the virtual machine in view of the message.

Example 13 includes the subject matter of example 12, wherein the measurement comprises a hash of contents of a memory associated with the virtual machine.

Example 14 includes the subject matter of example 12, wherein the first firmware comprises a shim firmware.

Example 15 includes the subject matter of example 12, wherein the second firmware comprises BIOS (Basic Input/Output System) or UEFI (United Extensible Firmware Interface).

Example 16 includes the subject matter of example 12, further comprising: performing the validation process in response to determining, in view of the message, that the virtual machine is authenticated by the guest owner.

Example 17 includes the subject matter of example 12, further comprising: stopping the virtual machine on the host machine in response to determining, in view of the message, that the virtual machine is not authenticated by the guest owner.

Example 18 includes the subject matter of example 12, wherein performing the validation process comprises: receiving, by the virtual machine, secret data associated with the virtual machine; and validating the second firmware the receipt of the secret data.

Example 19 includes the subject matter of example 18, wherein the secret data comprises data to be used to boot the virtual machine on the host machine.

Example 20 includes the subject matter of example 18, wherein the secret data is encrypted using an encryption key that is inaccessible to a hypervisor managing the virtual machine.

Example 21 includes the subject matter of example 12, wherein performing the validation process comprises determining whether the second firmware is signed by a predetermined entity.

Example 22 includes the subject matter of example 12, wherein performing the validation process comprises determining whether the second firmware is signed using a predetermined key.

Example 23 includes the subject matter of example 19, wherein the first firmware comprises a public key, and wherein the predetermined key comprises a private key matching the public key.

Example 24 is a method comprising: receiving, by a processing device, secret data associated with a virtual machine; injecting the secret data into the virtual machine; loading, by a first firmware of the virtual machine, a second firmware of the virtual machine; and performing, by the first firmware, a validation process to validate the second firmware of the virtual machine to boot the virtual machine on a host machine.

Example 25 includes the subject matter of example 24, wherein performing the validation process comprises determining, by the first firmware, whether the second firmware is signed by a predetermined entity.

Example 26 includes the subject matter of example 25, wherein performing the validation process comprises determining, by the first firmware, whether the second firmware is signed using a predetermined key.

Example 27 includes the subject matter of example 26, wherein the first firmware comprises a public key, and wherein the predetermined key comprises a private key matching the public key.

Example 28 includes the subject matter of example 24, further comprising: in response to determining that the second firmware of the virtual machine is valid, booting the virtual machine on the host machine using the secret data.

Example 29 includes the subject matter of example 24, further comprising: stopping the virtual machine on the host machine in response to determining that the second firmware of the virtual machine is invalid.

Example 30 includes the subject matter of example 24, wherein the secret data comprises data to be used to boot the virtual machine on the host machine.

Example 31 includes the subject matter of example 24, wherein the secret data is encrypted using an encryption key that is inaccessible to a hypervisor managing the virtual machine.

Example 32 is an apparatus comprising: means for receiving a request to launch a virtual machine on the host machine; means for starting the virtual machine comprising a first firmware; means for performing a first validation process to authenticate the virtual machine with a server of a guest owner; and means for performing a second validation process to validate a second firmware of the virtual machine.

Example 33 includes the subject matter of example 32, further comprising the subject matter of any of examples 1-31.

Example 34 is a system comprising: a memory; and a processing device operatively coupled to the memory, the processing device to implement the subject matter of any of examples 1-31.

Example 35 is a non-transitory machine-readable storage medium including instructions that, when accessed by a processing device, cause the processing device to implement the subject matter of any of examples 1-31.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600, and 700 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
   initiating a boot process to launch a virtual machine on a host machine, wherein the virtual machine is associated with a first firmware;
   authenticating the virtual machine with an external server using the first firmware;
   receiving, from the external server, secret data associated with the virtual machine, wherein the secret data is encrypted with an encryption key; and
   responsive to authenticating a second firmware using the first firmware, completing the boot process to launch the virtual machine using the authenticated second firmware and based on the secret data.

2. The method of claim 1, wherein the first firmware is designated to authenticate the virtual machine with the external server and to authenticate the second firmware.

3. The method of claim 1, wherein the second firmware corresponds to at least one of a Basic Input/Output System (BIOS) firmware or a United Extensible Firmware Interface (UFEI).

4. The method of claim 1, wherein authenticating the virtual machine using the first firmware comprises:
   obtaining, using the first firmware, a measurement indicating a state of the virtual machine; and
   transmitting the measurement to the external server.

5. The method of claim 4, wherein the measurement indicating the state of the virtual machine comprises a hash of contents of a memory associated with the virtual machine.

6. The method of claim 4, further comprising:
   receiving, from the external server, an indication that the measurement is not valid; and
   terminating the boot process to launch the virtual machine on the host machine.

7. The method of claim 1, further comprising:
   responsive to receiving the secret data associated with the virtual machine, loading the second firmware onto the host machine.

8. The method of claim 1, wherein authenticating the second firmware using the first firmware comprises at least one of:
- determining, using the first firmware, whether the second firmware is signed by a predetermined entity; or
- determining, using the first firmware, whether the second firmware is signed using a predetermined key.

9. The method of claim 1, wherein the secret data comprises another encryption key to be used to boot the virtual machine on the host machine.

10. A system comprising:
a memory; and
processor coupled to the memory, the processor to:
- initiate a boot process to launch a virtual machine on a host machine,
wherein the virtual machine is associated with a first firmware;
- authenticate the virtual machine with an external server using the first firmware;
- receive, from the external server, secret data associated with the virtual machine, wherein the secret data is encrypted with an encryption key; and
- responsive to authenticating a second firmware using the first firmware, complete the boot process to launch the virtual machine using the authenticated second firmware and based on the secret data.

11. The system of claim 10, wherein the first firmware is designated to authenticate the virtual machine with the external server and to authenticate the second firmware.

12. The system of claim 10, wherein the second firmware corresponds to at least one of a Basic Input/Output System (BIOS) firmware or a United Extensible Firmware Interface (UFEI).

13. The system of claim 10, wherein to authenticate the virtual machine using the first firmware, the processor is to:
- obtain, using the first firmware, a measurement indicating a state of the virtual machine; and
- transmit the measurement to the external server.

14. The system of claim 13, wherein the measurement indicating the state of the virtual machine comprises a hash of contents of a memory associated with the virtual machine.

15. The system of claim 13, wherein the processor is further to:
- receive, from the external server, an indication that the measurement is not valid; and
- terminate the boot process to launch the virtual machine on the host machine.

16. The system of claim 10, wherein the processor is further to:
- responsive to receiving the secret data associated with the virtual machine, load the second firmware onto the host machine.

17. A non-transitory computer-readable storage medium comprising instructions that, when accessed by a processor, cause the processor to:
- initiate a boot process to launch a virtual machine on a host machine, wherein the virtual machine is associated with a first firmware;
- authenticate the virtual machine with an external server using the first firmware;
- receive, from the external server, secret data associated with the virtual machine, wherein the secret data is encrypted with an encryption key; and
- responsive to authenticating a second firmware using the first firmware, complete the boot process to launch the virtual machine using the authenticated second firmware and based on the secret data.

18. The non-transitory computer-readable storage medium of claim 17, wherein the first firmware is designated to authenticate the virtual machine with the external server and to authenticate the second firmware.

19. The non-transitory computer-readable storage medium of claim 17, wherein the second firmware corresponds to at least one of a Basic Input/Output System (BIOS) firmware or a United Extensible Firmware Interface (UFEI).

20. The non-transitory computer-readable storage medium of claim 17, wherein to authenticate the virtual machine using the first firmware, the processor is to:
- obtain, using the first firmware, a measurement indicating a state of the virtual machine; and
- transmit the measurement to the external server.

* * * * *